Figure 1:
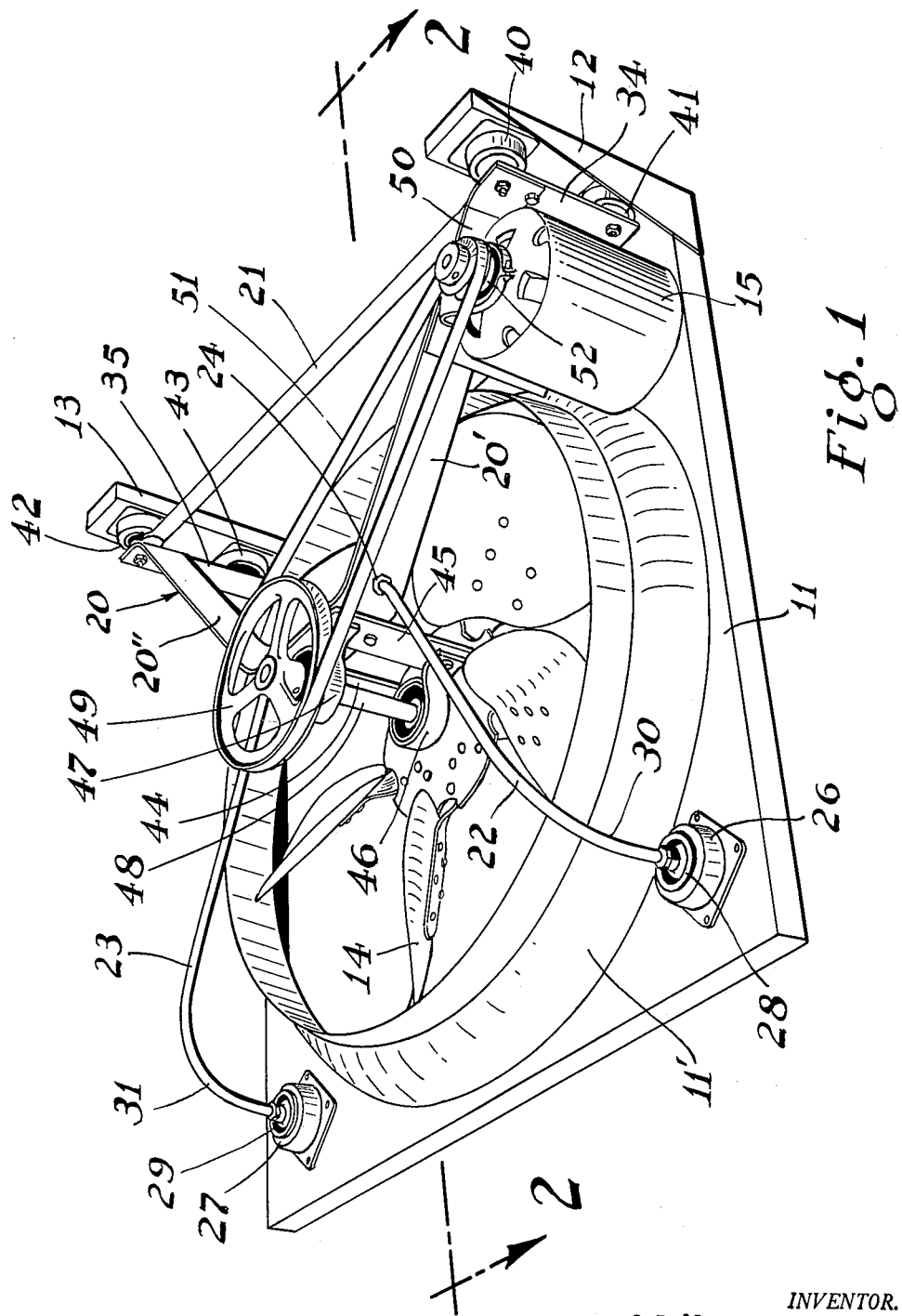

Feb. 21, 1956     W. W. McLEAN     2,735,611
VENTILATING APPARATUS

Filed Feb. 25, 1954     2 Sheets-Sheet 1

INVENTOR.
Wallace W. McLean
BY
William A. Zalesak
ATTORNEY

INVENTOR.
Wallace W. McLean

United States Patent Office 2,735,611
Patented Feb. 21, 1956

2,735,611

VENTILATING APPARATUS

Wallace W. McLean, Princeton, N. J.

Application February 25, 1954, Serial No. 412,525

9 Claims. (Cl. 230—117)

My invention relates to fans, particularly to large ventilating fans and to improved supporting housings therefor which render the fan substantially noiseless during operation of the fan.

Ventilating fans must move large quantities of air and must do so with a minimum of noise to be acceptable. Large fans require large and heavy housings and driving motors. Attempts have been made to reduce the noise, particularly of vibration caused by the moving parts by isolating the supporting housing from the structure in which it is supported and by mounting the driving motor on vibration absorbing supports. However, in order to prevent air leaks canvas ducts are connected between the supporting housing and the chambers and structures to be ventilated. It is normal practice to weld the fan supports to the supporting housing as well as mount the driving motor on the housing. The motor and the fan shaft and pulley are mounted rigidly with respect to each other on the housing and adjusted to keep the driving belt taut.

These structures require careful isolation of the housing from its supporting structure to prevent vibration noise being transmitted to the supporting structure. Because of the permanent fixing of the fan and motor support to the housing, installation becomes more difficult, particularly where small openings are encountered. Tautness of the belt accelerates belt failure and also causes rapid wear of the moving parts such as the bearings which are unevenly worn. In addition, the fan shaft is subjected to large bending moments, particularly on starting.

It is the principal object of my invention to provide a fan and supporting housing of improved design which substantially completely eliminates vibration noise.

It is another object of my invention to provide such a fan and supporting housing which nevertheless permits direct contact between the housing and the structure to be ventilated by the fan, thus eliminating the need for resiliently isolating the housing from its support as well as the need for a canvas duct.

A still further object of my invention is to provide apparatus of the kind described in which longer belt life is assured as well as one which reduces wear of the moving parts to a substantial degree.

Another object of my invention is to provide apparatus of the kind described which is so constructed as to greatly simplify and facilitate installation.

Briefly, a ventilating fan assembly made according to my invention comprises a supporting panel having a centrally disposed venturi throat opening in which the fan is mounted. The supporting frame includes a flexible V-shaped element the arms of which extend radially from the opening and a pair of radially extending arms or braces having one end secured to the arms near the apex of the V and the outside ends resiliently mounted in the panel. A pair of support brackets extend normally of the panels adjacent one end thereof and the outer ends of the arms of the V-shaped flexible member are each provided with a two-point flexible mounting so that the frame has a six-point suspension, two mounts lying in the plane of the panel and the other four in a plane normal to the panel. A brace connects the outer ends of the arms of the V-shaped member. The fan is mounted in shock absorbing bearings at the apex of the V-shaped member and the driving motor is mounted on one of the flexible arms of the V-shaped member, the armature in vibration isolating bearings. The usual driving belt connects the driving motor and the fan pulley mounted on the fan shaft. This arrangement provides a triple isolation arrangement for vibrations generated in the moving parts and has other advantages pointed out below.

Figure 2:
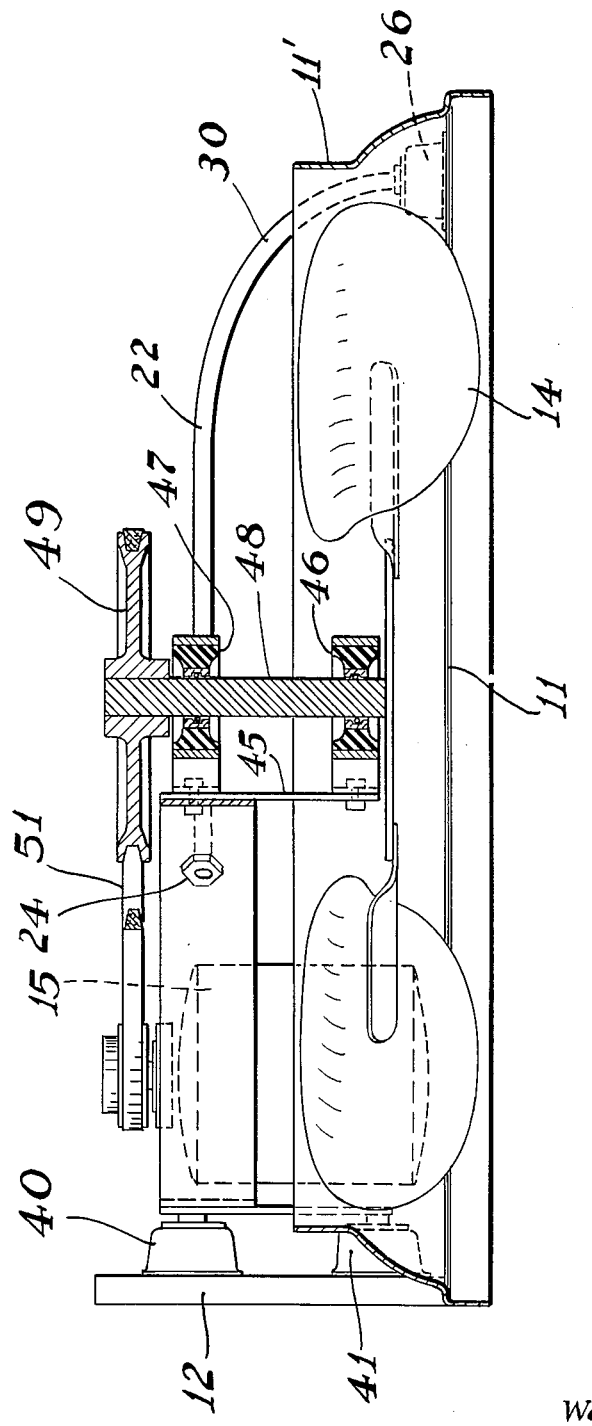

Other objects of the invention will appear in the following description with reference to the drawing, in which:

Fig. 1 shows a perspective of a ventilating fan assembly made according to my invention; and Fig. 2 is a section taken along line 2—2 of Fig. 1.

Referring to the drawings, apparatus made according to my invention includes a housing support including the panel member 11 having a centrally positioned orifice throat or opening 11' and at one end thereof a pair of bracket members 12 and 13 extending normally of panel 11. The fan 14 is mounted within the throat 11' and is connected to the driving motor 15 by means of the usual driving belt 51.

The supporting frame for supporting the fan and motor on the panel 11 and which includes the features of my invention include the V-shaped member 20, preferably made of flexible steel strap, the legs 20' and 20" of which extend radially from the opening. The outer ends of legs 20' and 20" are connected together by a rigid brace member or tie rod 21. Supporting arms 22, 23 extending substantially radially from the opening of the orifice throat 11' have their inner ends secured to the flexible arms of the V-shaped member 20 either by welding or by preferably being threaded and bolted to the arms by means of nuts 24. The outer ends of these supporting arms or braces are curved toward the panel member 11 and secured to the panel by means of the shock absorbing mounts 26 and 27 of conventional design which are provided with resilient flexible diaphragms 28 and 29 made, for example, of rubber to which the outer ends of the arms are bolted.

The outer ends of arms 20' and 20" of the V-shaped member 20 are preferably secured to rigid straps 34, 35 which are, in turn, secured at their ends to shock absorbing mounts 40, 41, 42, and 43, these being similar to the devices shown at 26 and 27. Mount 43 could, in case of smaller fans, be eliminated.

Thus, it will be noted that the supporting frame comprising the members 20, 21, 22, and 23 have a six-point resilient connection to the supporting housing panel 11 so that the entire frame is completely isolated from the panel 11 by resilient shock absorbing mounts.

The fan 14, fan shaft 48 and driving pulley 49 are supported on the frame with the fan within the throat on supporting straps 44, 45 connected to the V-frame by means of the rubber mounted bearings such as 46 and 47, which could be ball bearings.

The driving motor 15 may be mounted on a plate 50 secured to one arm 20' of the V-shaped member 20. Straps would serve equally well. The armature of the motor may be supported in rubber bearings such as 52 to isolate vibrations and noise of the armature from the flexible arm 20'.

An analysis of the construction described follows:

Vibration is found in the fan blades 14, the rotating shaft 48 and pulley 49, the belt 51 and the armature of motor 15 which comprise all of the moving parts of the assembly. Vibrations originating in the fan and some of the vibration originating in the belt will be transmitted through bearings 46 and 47. However, this vibration is partially absorbed by the resilient parts of the bearing assembly 46 and 47. Any vibration not so absorbed is transmitted to the arms 20' and 20" of flexible V-shaped member 20. Vibrations originating in the motor armature and the balance of the vibration originating in the belt 51 are further partially absorbed by the resilient bearings such as 52 in the motor mounting. Any vibration not absorbed at this point is transmitted to the flexible V-shaped member 20. Since the V-shaped member 20 is very flexible, it absorbs a major part of the vibration transmitted to it from the sources described above.

The vibration not absorbed by the V-shaped member 20 is absorbed by the shock absorbing mounts 40 to 43, inclusive. Since the arms 22 and 23 are attached to the frame member 20, some vibration may be transmitted to these arms. However, since the outer ends are resiliently mounted in the shock and vibration isolators 26 and 27, substantially no noise or vibration is transmitted to the panel 11.

The unusual frame support permits movement of the frame assembly, fan, and motor in all directions so that vibration is substantially completely eliminated. It is believed that when the fan is in operation and it is intended primarily to be operated with the panel in a horizontal position, although the assembly may be otherwise mounted, to drive the flow of air downwardly, the turning moment of the frame assembly places the diaphragms 28, 29 under tension in an upward direction and the diaphragms of the absorbers 40, 42 under tension to the right as viewed in Fig. 1 and the diaphragms of the shock mounts 41, 43 to the left under tension. At rest diaphragms 28, 29 are placed under tension downwardly with respect to Fig. 1 since they support the weight of the fan, whereas the diaphragms of the other mounts are partially under compression and partially under tension. If the fan is reversed, the above described actions and forces would of course also be reversed.

Thus, all moving elements which generate vibration and noise are resiliently supported from the frame and the frame itself is so constructed and resiliently supported from the panel that substantially no vibration reaches the panel 11.

A feature of my invention is that the flexibility of the arms of the V-shaped member permit the center of the motor shaft to vary its position with respect to the center of the fan shaft, providing a reasonably constant tension to be exerted on the belt.

The result of the above construction is that the flexible frame which replaces the usual rigid frame results in quieter operation and because of the automatic belt tension, the life of the belt is increased many times over that with usual arrangements. This also reduces the wear of moving parts such as elliptical bearing wear caused by taut belts. Since the frame is completely resiliently mounted and free to move in any direction, the entire apparatus is quieter since no vibrations can reach the frame which may be directly supported on the structure to be ventilated, thus eliminating the need for canvas duct connections. The bolted arrangement facilitates installation since the parts can be disassembled in order to move the assembly through narrow openings. The arrangement provides a minimum of three points of noise and vibration isolation between the moving parts and the frame thus assuring a maximum of quiet operation.

What I claim is:

1. A ventilating fan assembly including a supporting housing having a panel provided with an opening, a frame for supporting a fan within said opening and comprising a supporting means having radially extending arms, a fan rotatably supported on said supporting means, shock absorbing devices including flexible diaphragms connected between the outer ends of said arms and said panel and a driving motor mounted on one only of said arms and connected to said fan, at least two adjacent of said arms of said frame being flexible.

2. A ventilating fan assembly including a supporting housing having a panel provided with an opening, a frame for supporting a fan within said opening and comprising a supporting means having radially extending arms, a fan rotatably supported on said last supporting means, shock absorbing devices including flexible diaphragms connected between the outer ends of said arms and said panel, at least two adjacent arms of said frame being flexible, and a motor mounted on one only of said flexible arms and connected to said fan.

3. A ventilating fan assembly comprising a supporting housing having a panel provided with a venturi throat, supporting means mounted adjacent one edge of said panel and extending in a plane normal to said panel, a supporting frame comprising a V-shaped member of flexible strap material having its arms extending radially from the center of said venturi throat, rod-like supporting arms extending substantially radially from the center of said throat and having their inner ends connected to the arms of said V-shaped member, shock absorbing devices including resilient diaphragms connected between the panel and the outer ends of the rod-like supporting arms, shock absorbing devices mounted on said normally extending supporting means, the outer end of each of the arms of said V-shaped member being secured to said last shock absorbing devices, a fan mounted within said venturi throat and supported by the inner ends of said arms and a motor mounted on one only of said flexible arms and connected to said fan.

4. A ventilating fan assembly comprising a supporting housing having a panel provided with a vesturi throat, supporting means mounted adjacent one edge of said panel and extending in a plane normal to said panel, a supporting frame comprising a V-shaped member of flexible strap material having its arms extending radially from the center of said venturi throat and parallel to said panel, rod-like supporting arms extending substantially radially from the center of said throat and parallel to said panel and having their inner ends connected to the flexible arms of said V-shaped member, shock absorbing mounts including resilient diaphragms connected to the outer ends of said rod-like supporting arms and between the panel and the said rod-like supporting arms, shock absorbing mounts mounted on said normally extending supporting means, the outer ends of the arms of said V-shaped member being secured to said shock absorbing mounts, a fan mounted within said orifice throat and supported by the inner ends of said arms and a motor mounted on one only of said flexible arms and connected to said fan.

5. A ventilating fan apparatus including a supporting housing comprising a panel having an orifice throat, a pair of spaced brackets extending normally of said panel and mounted adjacent one edge of said panel, a supporting frame mounted on said panel and including a flexible V-shaped strap-like member having arms extending radially from the center of said throat and parallel to said panel, rigid rod-like arms connected to each of said flexible arms of said V-shaped member adjacent the center of said throat and extending substantially radially therefrom and lying parallel to said panel, the outer ends of said rod-like arms being bent to extend normally of said panel, flexible mount supports each including a diaphragm connected between the outer ends of each of said rod-like elements and said panel, a pair of spaced flexible mount supports mounted on each of said brackets, the outer ends of the arms of said V-shaped member each being connected to one of said brackets by the pair of flexible mount supports thereon and a connecting member extending between the outer ends of said V-shaped member, a support mounted on said frame adjacent said orifice throat and a fan assembly including a fan shaft and pulley and having vibration isolating bearings mounted on said last support, a motor having a vibration isolating bearing supported armature mounted on one only of said flexible arms of said V-shaped member and a belt connected between said pulley and said motor.

6. A ventilating fan apparatus including a supporting housing comprising a panel having an orifice throat, a pair of spaced brackets extending normally of said panel and mounted adjacent one edge of said panel, a supporting frame mounted on said panel and including a flexible V-shaped strap-like member having flexible arms extending radially from the center of said throat, a separate rod-like member connected to each of said flexible arms of said V-shaped member adjacent the center of said throat, said arms rod-like members lying parallel to said panel, the outer ends of said rod-like members being bent to extend normally of said panel, flexible mount supports each including a diaphragm connected between the outer ends of each of said rod-like members and said panel, flexible shock isolating mount supports mounted on each of said brackets, the outer ends of the arms of said V-shaped member each being connected to one of said brackets by said last mount supports, a fan assembly including a fan shaft and pulley and having vibration isolating bearings supporting said fan assembly at the inner ends of said arms and said rod-like members, a motor having a vibration isolated armature mounted on one of said flexible arms of said V-shaped member and a belt connected between said pulley and said motor.

7. A ventilating fan apparatus including a supporting housing comprising a panel member having an orifice throat, a pair of spaced brackets extending normally of said panel and mounted adjacent one edge of said panel, a supporting frame mounted on said panel and including a flexible V-shaped strap-like member having flexible arms extending radially from the center of said throat, rod-like arms connected to said flexible arms of said V-shaped member and extending substantially radially from the center of said throat, the outer ends of said rod-like arms being bent to extend normally of said panel, flexible mount supports each including a diaphragm connected between the outer ends of said rod-like elements and said panel, a pair of spaced flexible mount supports mounted on each of said bracket members, the outer ends of the arms of said V-shaped member each being connected to one of said brackets by the pair of flexible mount supports thereon and a fan assembly including a fan shaft and pulley and having vibration isolating bearings mounted at the inner ends of said radially extending arms, a motor having a vibration isolating bearing supported armature mounted on one only of said flexible arms of said V-shaped member and a belt connected between said pulley and said motor.

8. A ventilating fan apparatus including a panel having a venturi throat extending from one surface thereof, a frame for supporting a fan within said venturi throat including a V-shaped member of flexible strap-like form, the arms of said V-shaped member extending substantially radially from the center of said throat, rod-like arms connected to said straps adjacent the center of said throat and extending substantially radially from the center of said throat and parallel to said panel, the outer ends of said rod-like arms being formed to extend normally of said panel, said V-shaped member and said rod-like arms being positioned on the throat side of the panel, a pair of spaced supporting brackets mounted on said panel adjacent one edge thereof and on the same side of said panel as said throat, a pair of spaced vibration absorbing members each including a diaphragm supported on each of said brackets, the outer ends of the arms of said V-shaped member being secured to the diaphragms and supported on said vibration absorbing mounts, vibration absorbing mounts connected between said panel and the ends of said rod-like arms, a supporting member positioned at the inner ends of said arms and extending within said throat, a fan assembly including a fan, shaft and pulley having shock isolating bearings mounted on said last supporting member, a motor mounted on one only of said flexible arms of said V-shaped member and positioned outside of said throat and a driving belt connected between said motor and said pulley.

9. A ventilating fan apparatus including a panel having a venturi throat extending from one surface thereof, a frame for supporting a fan within said venturi throat including a V-shaped member of flexible strap-like form, the arms of said V-shaped member extending substantially radially from the center of said throat, rod-like arms connected to said straps adjacent the center of said throat and extending substantially radially from the center of said throat, the outer ends of said rod-like arms being formed to extend normally of said panel, said V-shaped member and said rod-like arms being positioned on the throat side of the panel, a pair of spaced supporting brackets mounted on said panel adjacent one edge thereof and on the same side of said panel as said throat, a pair of spaced vibration absorbing members supported on each of said brackets, the outer end of one of the arms of said V-shaped member being secured to and supported on one of the pair of vibration absorbing mounts and the outer end of the other arm of the V-shaped member being secured to and supported on the other pair of vibration supporting mounts, vibration absorbing mounts connected between said panel and the ends of said rod-like arms, a supporting member positioned at the inner ends of said arms, a fan assembly including a fan, shaft and pulley having shock isolating bearings mounted on said last supporting member, a motor mounted on one only of said flexible arms of said V-shaped member and positioned outside of said throat and a driving belt connected between said motor and said pulley.

References Cited in the file of this patent

UNITED STATES PATENTS

| | | |
|---|---|---|
| 1,935,179 | Orear | Nov. 14, 1933 |
| 2,223,872 | McWhorter | Dec. 3, 1940 |
| 2,558,541 | Cotten | June 26, 1951 |
| 2,573,145 | Sprouse | Oct. 30, 1951 |